United States Patent
Merienne et al.

(10) Patent No.: US 11,167,633 B2
(45) Date of Patent: Nov. 9, 2021

(54) METHOD OF CONTROLLING THE DECLUTCHING OF A SLIDING GEAR

(71) Applicant: Nissan Motor Co., Ltd., Yokohama (JP)

(72) Inventors: Ludovic Merienne, Gif sur Yvette (FR); Pedro Kvieska, Versailles (FR)

(73) Assignee: Nissan Motor Co., Ltd., Yokohama (JP)

( * ) Notice: Subject to any disclaimer, the term of this patent is extended or adjusted under 35 U.S.C. 154(b) by 631 days.

(21) Appl. No.: 15/998,966

(22) PCT Filed: Jan. 4, 2017

(86) PCT No.: PCT/FR2017/050008
§ 371 (c)(1),
(2) Date: Aug. 17, 2018

(87) PCT Pub. No.: WO2017/140961
PCT Pub. Date: Aug. 24, 2017

(65) Prior Publication Data
US 2021/0206255 A1   Jul. 8, 2021

(30) Foreign Application Priority Data
Feb. 19, 2016   (FR) .................................. 1651357

(51) Int. Cl.
*B60K 6/387* (2007.10)
*B60W 30/188* (2012.01)
(Continued)

(52) U.S. Cl.
CPC .............. *B60K 6/387* (2013.01); *B60K 6/547* (2013.01); *B60K 2006/4825* (2013.01); *F16H 61/28* (2013.01); *F16H 2306/46* (2013.01)

(58) Field of Classification Search
CPC .......... B60K 6/387; B60K 6/547; B60K 6/48; B60K 2006/4841; B60K 2006/4825;
(Continued)

(56) References Cited

U.S. PATENT DOCUMENTS 6,142,907 A * 11/2000 Minowa ................ B60W 10/06
477/5
2013/0045833 A1 * 2/2013 Okubo .................... B60L 50/16
477/5
(Continued)

FOREIGN PATENT DOCUMENTS

WO   WO-2017121943 A1 *  7/2017   ............. F16D 23/04

OTHER PUBLICATIONS

WO-2017121943-A1 (Jacquart, Jul. 2017)—Gearbox Synchronizer.*

*Primary Examiner* — Tinh Dang
(74) *Attorney, Agent, or Firm* — Global IP Counselors, LLP

(57) ABSTRACT

A control method is provided for controlling a declutching of a sliding gear of a vehicle gearbox having dogs. The sliding gear rotates with a shaft of the vehicle gearbox on which the sliding gear moves axially between a declutched position and an engaged position to transmit rotation to a vehicle wheel. The control method comprises applying a zero torque request to all power sources of the vehicle, applying a declutching instruction to the sliding gear, estimating a resistance torque on the dogs in absence of rapid declutching, calculating a residual torque on the dogs as a function of a calculated resistance torque and an anti-disengagement angle of the resistance torque on the dogs, cancelling the residual torque by application of two opposing cancellation torques on the sliding gear, and declutching the sliding gear.

10 Claims, 4 Drawing Sheets

(51) Int. Cl.
*B60W 30/19* (2012.01)
*B60K 6/547* (2007.10)
*B60K 6/48* (2007.10)
*F16H 61/28* (2006.01)

(58) Field of Classification Search
CPC .. F16H 61/28; F16H 2306/46; B60W 30/188; B60W 30/1884; B60W 30/19; F16D 23/04; F16D 2023/0631
See application file for complete search history.

(56) References Cited

U.S. PATENT DOCUMENTS

| | | | |
|---|---|---|---|
| 2013/0324340 A1* | 12/2013 | Holmes | B60K 6/445 475/5 |
| 2015/0354643 A1* | 12/2015 | Ebuchi | B60K 6/38 192/69 |
| 2017/0113679 A1* | 4/2017 | Hata | B60W 10/02 |
| 2018/0245692 A1* | 8/2018 | Meyer | B60W 10/02 |
| 2019/0217860 A1* | 7/2019 | Kishi | B60W 10/196 |

\* cited by examiner

METHOD OF CONTROLLING THE DECLUTCHING OF A SLIDING GEAR

CROSS-REFERENCE TO RELATED APPLICATIONS

This application is a U.S. national stage application of International Application No. PCT/FR2017/050008, filed on Jan. 4, 2017, which claims priority to French Patent Application No. 1651357, filed on Feb. 19, 2016.

BACKGROUND

The present invention concerns hybrid power trains including a dog gearbox with no integrated mechanical synchronization system or input clutch, enabling different transmission ratios between at least two power sources (thermal and electric) of a vehicle and the drive wheels thereof, with no interruption of the torque between the combustion engine and the gearbox during gear shifts.

SUMMARY

More specifically, the invention concerns a method for controlling the declutching of a sliding gear of a vehicle dog gearbox, that is constrained to rotate with a shaft of said gearbox, on which the sliding gear can move axially under the control of a powered shift actuator between a neutral declutched position and at least one engaged position on a hybrid gear where it is engaged with a pinion rigidly connected to the shaft in order to transmit the torque received from at least two distinct power sources to the wheels of the vehicle, cumulatively or otherwise.

This invention also relates to a hybrid power train including a multi-step gear box linked on a primary line with no disconnect clutch to a combustion engine and to at least one electric machine that can transmit, simultaneously or otherwise, the torque therefrom to the wheels of a vehicle over at least one hybrid gear that is engaged and disengaged respectively by the engagement and declutching of a sliding dog gear on a pinion gear.

Where a hybrid power train includes a gearbox with sliding dog gears without integrated synchronization systems, with no input clutch to interrupt the transmission of torque between the combustion engine and the wheels during gear shifts, the synchronization of a pinion on the shaft thereof, before the dogs of the sliding gear are engaged with the dogs of the pinion, is usually done by controlling the electric motor and/or combustion engine.

To ensure the gear ratio engaged is held, specific trapezoid-shaped teeth known as "dogs" can be used, as shown in FIGS. 1 and 2. In FIG. 1, the sliding gear 1 is in neutral and at an equal distance g from two pinions (not shown). The dogs 1a of the sliding gear 1 and the dogs 2a of the pinion (not shown) are cut in a trapezoid shape so that the transmission of torque in the gear ratio engaged holds or enhances the mutual meshing thereof in the engaged gear ratio position. This is the "anti-disengagement" function. The sliding gear 1 and the dogs 2a form a hybrid gear within a gearbox 3. The gearbox 3, combustion engine 4 and electric machine(s) 5 are all part of a hybrid power train 6, and the combustion engine 4 and the electric machine(s) 5 serve as drive sources for the power train 6 and transmit torque to the gearbox 3. The inclination of the dogs generates a reactive force $F_R$ that is inclined in relation to the tractive force $F_T$ applied to the dogs by the torque of the drive shaft. The reactive force $F_R$ opposes any output force $F_s$ from the dogs of the sliding gear.

Under these conditions, the torque transmitted by the shaft has to be cancelled out to enable disengagement of the sliding gear. Where the gearbox has an input clutch (or disconnect clutch), this problem is resolved simply by opening the clutch during the operation. Where there is no disconnect clutch, a disengagement actuator that is powerful enough to overcome the friction force generated by the anti-disengagement function is required.

All of the drive power sources of a power train, for example a combustion engine and one or two electric machines, can generate residual torque on the hybrid gears. These are controlled in such a way as to attempt to cancel out the residual torque on the shaft during declutching. The ideal solution for ensuring disengagement of the sliding gear is to cancel out the torque requested of the three motors. Electric motors offer a good response time. The torque thereof can be cancelled out in less than 100 ms. Conversely, combustion engines can have a response time of more than 500 ms at certain points of operation, in particular at low speeds. Cancelling out the torque on the sliding gear can take more than one second. This time is unacceptable in terms of driving comfort, since the torque cancellation time is an integral part of the gear shift time.

A first approach for immediately cancelling out the torque from the combustion engine involves using an estimate of said torque, issued by the engine processor on the communication network of the vehicle, and attempting to absorb this torque during the transient cancellation phase thereof. The success of this method depends on the other motors (electric machines) having the capacity to absorb this transient torque. In the best case scenario, said motors need to absorb exactly the inverse of the torque supplied by the combustion engine. In practice, the torque of the sliding gear is reduced, but the estimate of the torque of the combustion engine is not precise enough for the offsetting thereof by the other motors to enable declutching in all cases.

FIG. 3 shows a failed declutching sequence by offsetting the thermal torque by the electric machines. This failure is caused by a static error on the estimated torque Ce of the combustion engine. If the estimated torque injection cut off is 0 Nm, the real torque of the engine $C_R$ is negative. The setpoint torque G of the electric machine is zero. Declutching fails because of the anti-disengagement devices if a zero torque is requested of the electric machine at instant d. Indeed, the real torque $C_R$ at the sliding gear remains above the declutching threshold S (in absolute terms).

The activation time of the shift actuators also limits the chances of success of the operation, since these actuators cannot be stressed for too long before overheating. If the residual force on the dogs of the sliding gear is still high when the actuator is cut, declutching fails. In the common case in which the actuator acts on the sliding gear by means of a selector fork, it is possible that same may not have moved enough to disengage the gear ratio.

The incorrect estimation of the torque dynamics of the combustion engine can also be a cause of failure in itself. A common case, shown in FIG. 4, is that the estimated torque Ce converges rapidly towards the zero target thereof, while the real torque $C_R$, provided by the motor, drops more slowly, as it usually requires more than a second to be cancelled out. The setpoint torque $C_e$ of the electric machine is cancelled out too soon. The declutching attempt is premature, since the real torque G of the combustion engine is still too high. In FIG. 4, the declutching request is impossible to fulfil, if the time (from d1 to d2) during which it is outside the declutching threshold S is too long, since said time is greater than the maximum activation time $T_{max}$ of the actuator.

The present invention is intended to ensure the declutching of the sliding gear using a new method based on a correct estimation of the residual torque on the sliding gear that is not sensitive to inaccuracies in the estimates of the torque of the combustion engine.

The method proposed includes the following steps:
applying a zero torque request to all the power sources of the vehicle,
applying a declutching instruction to the sliding gear,
estimating the resistance torque on the dogs of the sliding gear in the absence of rapid declutching,
calculating the residual torque on the dogs as a function of the calculated resistance torque and the anti-disengagement angle of the resistance torque on the dogs,
cancelling the residual torque by application of two opposing cancellation torques on the sliding gear, and
declutching the sliding gear.

The method is particularly secure and is compatible with the thermal constraints of the gear shift actuation module.

BRIEF DESCRIPTION OF THE DRAWINGS

The present invention is further explained in the description below of a non-limiting embodiment thereof, provided with reference to the attached drawings, in which.

BRIEF DESCRIPTION OF THE DRAWINGS

Figure 1:
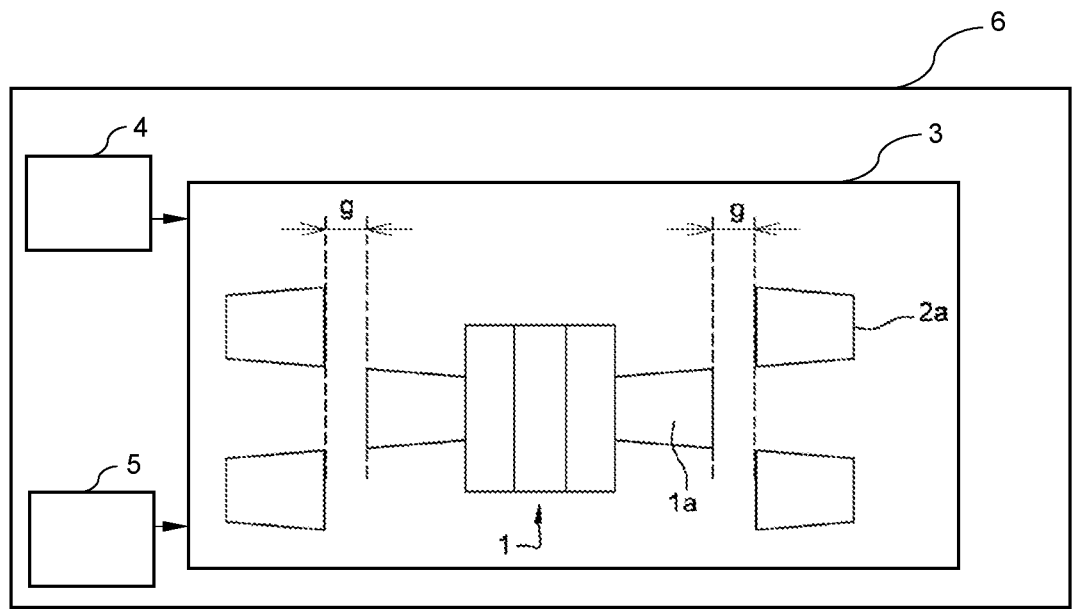
FIG. 1 is a schematic representation of a sliding gear in neutral between two pinions.
Figure 2:
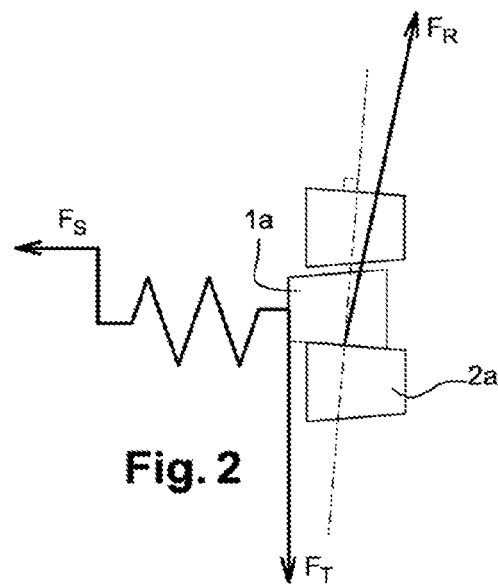
FIG. 2 shows the forces present during disengagement.
Figure 3:
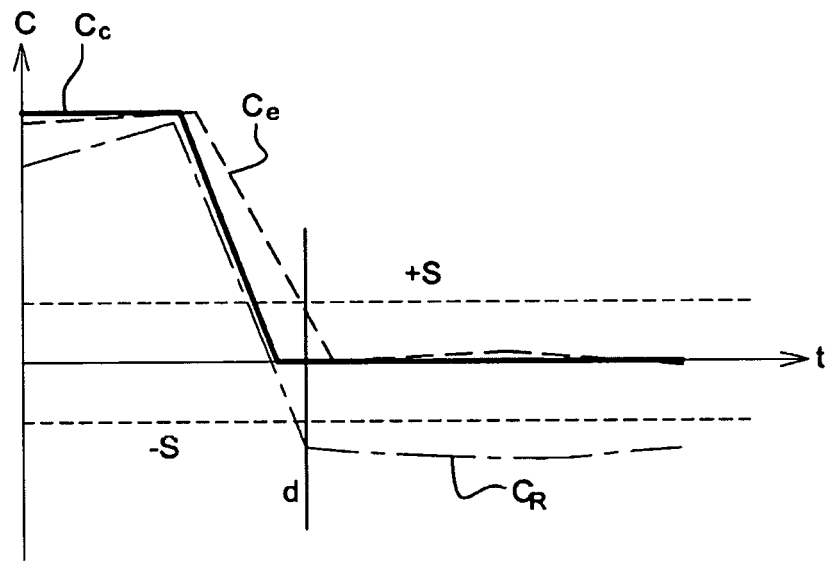
FIGS. 3 and 4 show two cases where declutching is impossible on a hybrid power train without integrated synchronization systems or an input clutch.
Figure 4:
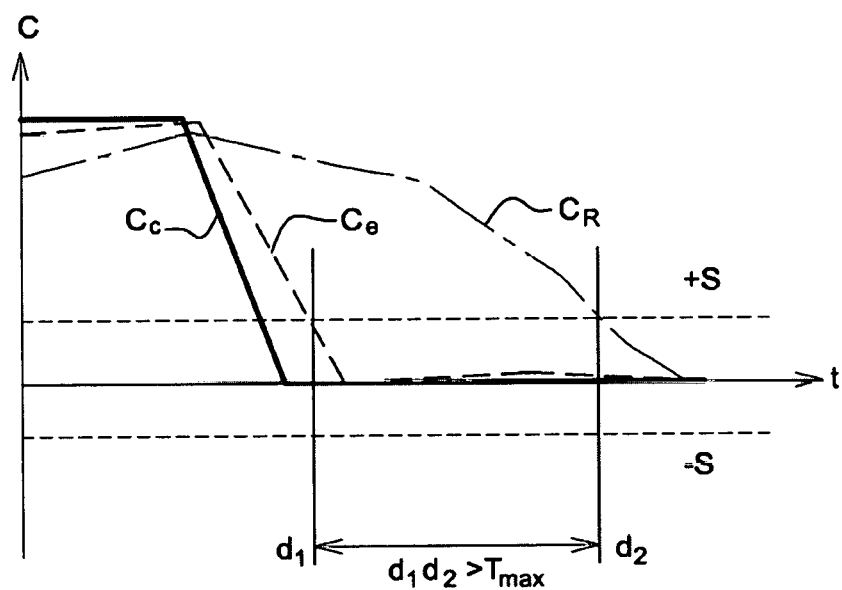
Figure 5:
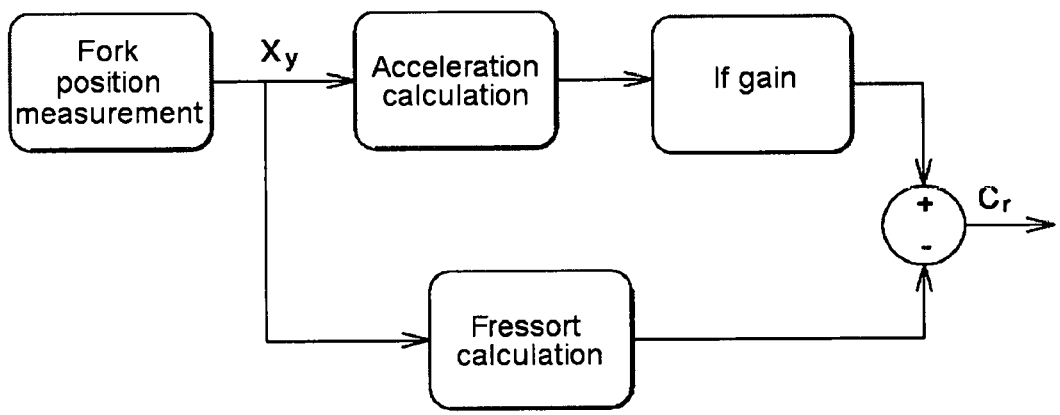
FIG. 5 is an observer of the resistance torque on the dog.

A first part of the method involves estimating the residual torque $C_{res}$ on the dog. The estimate itself actually concerns the resistance torque Cr on the dog. The resistance force Cr can be estimated by an observer such as the one in FIG. 5, using the following data:

$X_f$: measurement of the position of a selection fork (not shown) of the sliding gear,
$F_{ressort}$: force applied by an assistance spring,
$K_{ressort}$: torque coefficient of an assistance spring, and
$I_f$: fork inertia.

The inertia $I_f$ is a function of the difference between the position of a control member of the sliding gear, such as a selection fork, and the position of an actuating finger thereof. The force applied by the assistance spring depends only on the fork position. The equation governing the movement of the fork is as follows:

$$I_f \frac{d^2}{dt^2} X_f = F_{ressort} + C_r = K_{ressort} X_f + C_r$$

Figure 6:
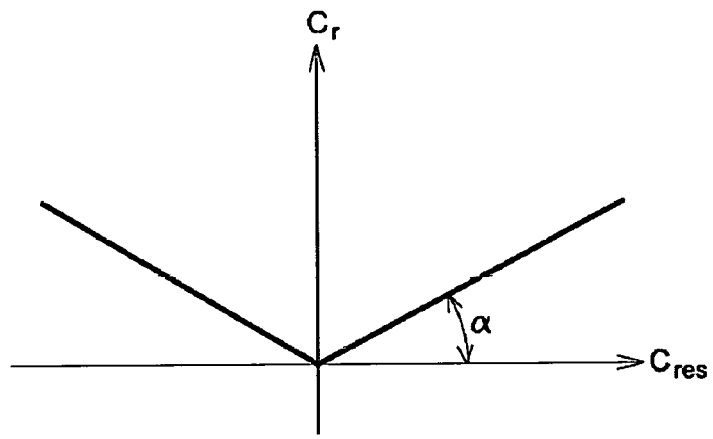
FIG. 6 is a map of resistance torque as a function of residual torque.

This makes it possible to calculate the gain on the inertia of the fork, which is compared to the force of the spring to obtain the resistance force. The resistance torque $C_r$ is obtained by subtracting the force of the spring $F_{ressort}$ from the gain on the inertia of the fork $I_f$, calculated as a function of the acceleration thereof. This provides an estimate of the resistance torque on the dogs. The residual torque also depends on the anti-disengagement angle thereof. For a given anti-disengagement angle $\alpha$, the resistance torque on the dogs can be mapped as a function of the residual torque $C_{res}$, as shown in FIG. 6, with two straight lines converting the same resistance torque $C_r$ into two opposing residual torque values at the dog $C_{res}$, depending on the anti-disengagement angle $\alpha$. Application of one of the values thereof to the dogs of the sliding gear cancels out the residual torque Cres, while the other doubles the residual torque.

The solution adopted is to request the electric motor to apply a torque selected at random between the two residual torque values $C_{res}$ calculated. If the value applied actually cancels out the torque of the combustion engine, the fork moves towards the neutral position, and declutching is carried out. If the fork is observed to move away from the neutral position thereof, then the torque of the electric machine has increased the residual torque. The second value can then be applied, necessarily cancelling out the residual torque. Declutching is performed.

Figure 7:
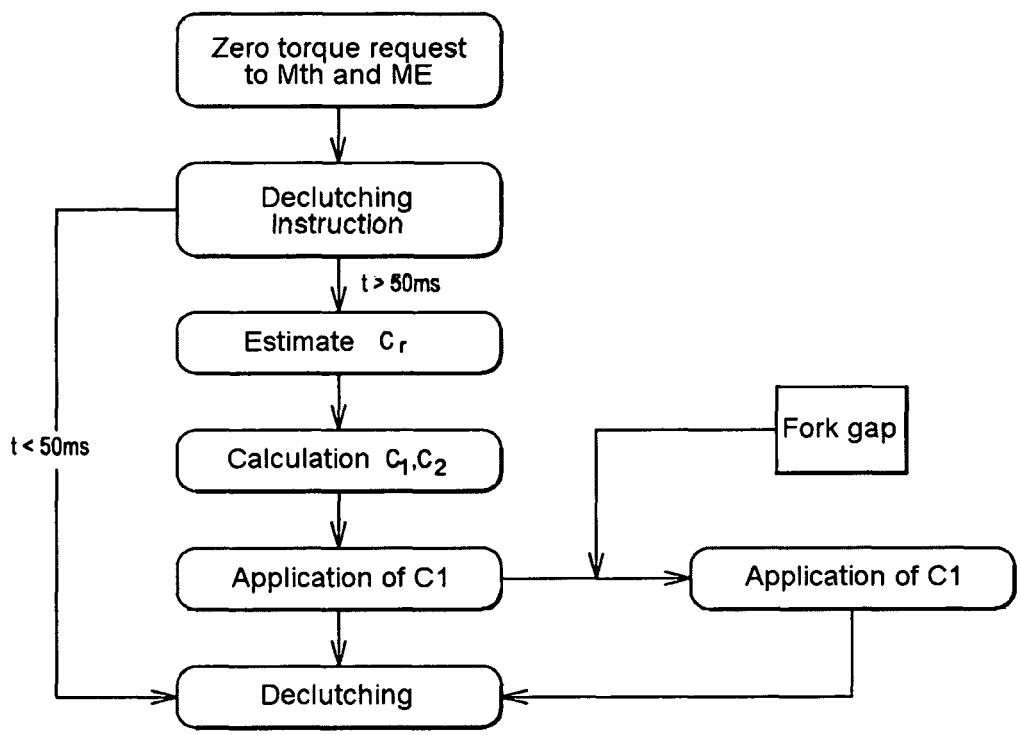
FIG. 7 is a diagram of the implementation strategy.

The strategy is summarized in FIG. 7 (in the non-limiting example of a power train including a combustion engine and a single electric machine). More generally, the invention applies to controlling the declutching of a sliding gear of any vehicle dog gearbox, that is constrained to rotate with a shaft of said gearbox, on which the sliding gear can move axially under the control of a powered shift actuator between a neutral declutched position and at least one engaged position on a hybrid gear where it is engaged with a pinion rigidly connected to the shaft in order to transmit the torque received from at least two distinct power sources to the wheels of the vehicle, cumulatively or otherwise.

When the gearbox is commanded to perform a gear shift involving declutching the sliding gear, a zero torque request is applied to the combustion engine (Mth) and to the electric machine (ME). When the torque values thereof are estimated to be low enough to enable declutching, the declutching instruction is sent to the shift actuator in question. If declutching has not occurred within a given time, such as 50 ms, it is assumed that there is still excessive residual torque on the dog. The resistance torque $C_r$ is then estimated, and can be used to calculate the cancellation torque values C1 and C2 for the residual torque $C_{res}$. The first is applied for example for 50 ms, checking the evolution of the fork position. The direction of movement of a selection fork of the sliding gear is observed during application of a first cancellation torque value C1. If the fork moves away from the neutral position thereof following application of the first value C1, the second value C2 is applied for the same time as the first, to ensure declutching. The two opposing cancellation torque values C1, C2 are applied successively to the sliding gear if one of said values fails. With the times indicated, declutching is achieved in all cases in less than 150 ms.

In summary, the method includes at least the following steps:
applying a zero torque request to all the power sources of the vehicle,
applying a declutching instruction to the sliding gear,
estimating the resistance torque $C_r$ on the dogs of the sliding gear in the absence of rapid declutching (t>50 ms),
calculating the residual torque $C_{res}$ on the dogs as a function of the calculated resistance torque and the anti-disengagement angle of the resistance torque on the dogs, cancelling the residual torque $C_{res}$ by application of opposing cancellation torques C1, C2 on the sliding gear, and declutching the sliding gear.

The main advantage of the invention is not requiring any additions to the existing gear shift actuation modules. The invention also obviates the need to resize the actuation motors thereof.

Given that a gear shift should take around 1 s, the increased declutching time engendered by implementation of the invention, for example of 50 ms to 150 ms, remains within acceptable limits in terms of driving comfort.

The description above sets out one preferred method for estimating the resistance torque. However, other observation techniques can be adopted that are equally robust against measurement noise, as a function of the quality of the available fork position measurements, without thereby moving outside the scope of the invention.

As a variant, a torque scan can be formed by the electric machine without previously estimating the resistance torque. However, this variant significantly increases the declutching time since, instead of choosing between two torque values, a choice is made from a wide range of values, and as such the scan takes a significant time to complete. The method nonetheless makes it possible to ensure declutching in all cases, without resizing any component of the actuator.

As indicated above, the method proposed is advantageously applied to any hybrid power train including a multi-step gear box linked on a primary line with no disconnect clutch to a combustion engine and to at least one electric machine that can simultaneously transmit the torque therefrom to the wheels of a vehicle over at least one hybrid gear that is engaged and disengaged respectively by the engaging and declutching of a sliding dog gear on a pinion gear. In such a power train, declutching of the sliding gear can be controlled by applying the method. The method is particularly effective where the sliding gears in question do not have integrated synchronization systems, and where the dogs of the sliding gears have a non-zero anti-disengagement angle.

The invention claimed is:

1. A control method for controlling declutching of a sliding gear of a vehicle gearbox with dogs that is constrained to rotate with a shaft of the vehicle gearbox on which the sliding gear can move axially under control of a powered shift actuator between a neutral declutched position and at least one engaged position where the sliding gear is engaged on a pinion rigidly connected to the shaft in order to transmit to a vehicle wheel the torque received from at least two distinct power sources, the control method comprising:

sending a zero torque request to all the power sources of the vehicle, sending a declutching instruction to the sliding gear, estimating a resistance torque on the dogs of the sliding gear in absence of rapid declutching, calculating a residual torque on the dogs as a function of a calculated resistance torque and an anti-disengagement angle of the resistance torque on the dogs, cancelling the residual torque by applying at least one of two opposing cancellation torques to the sliding gear, and declutching the sliding gear.

2. The control method as claimed in claim 1, wherein
the calculating of the residual torque includes calculating the two opposing cancellation torques for the residual torque, and the cancelling of the residual torque comprises successively applying the two opposing cancellation torques to the sliding gear if one of the two opposing cancellation torques fails.

3. The control method as claimed in claim 2, further comprising observing a direction of movement of a selection fork of the sliding gear during application of a first cancellation torque of the two opposing cancellation torques.

4. The control method as claimed in claim 3, further comprising following the application of the first cancellation torque, applying a second cancellation torque of the two opposing cancellation torques to the sliding gear if the selection fork moves away from a neutral position of the selection fork following the application of the first cancellation torque.

5. The control method as claimed in claim 3, wherein
the estimating of the resistance torque on the sliding gear is estimated as a function of:
   a measurement of the position of the selection fork of the sliding gear,
   a force applied by an assistance spring,
   a torque coefficient of the assistance spring, and
   an inertia of the selection fork.

6. The control method as claimed in claim 5, wherein
the estimating of the resistance torque is obtained by subtracting the force of the assistance spring from a gain on the inertia of the fork as a function of an acceleration thereof.

7. The control method as claimed in claim 1, wherein
the power sources include a combustion engine and at least one electric machine.

8. The control method as claimed in claim 7, wherein
the residual torque is applied to the sliding gear using the combustion engine, and the two opposing cancellation torques are applied using the at least electric machine.

9. A hybrid power train comprising:

the at least two distinct power sources, the at least two distinct power sources including a combustion engine and at least one electric machine; and the vehicle gearbox directly disposed on a shaft connected to the combustion engine and to the at least one electric machine to simultaneously transmit torque from the combustion engine and the at least one electric machine to the vehicle wheel by selectively engaging and declutching the sliding gear, wherein the hybrid power train is configured to control declutching of the sliding gear as recited in claim 1.

10. The hybrid power train as claimed in claim 9, wherein
the sliding gear has no integrated synchronization system, and the anti-disengagement angle has a non-zero value.

* * * * *